Dec. 22, 1964
H. J. VERBEEK 3,162,517
ARRANGEMENT FOR SEPARATING IN A SOLID STATE
CONSTITUENTS FROM A GAS MIXTURE
Filed May 8, 1961
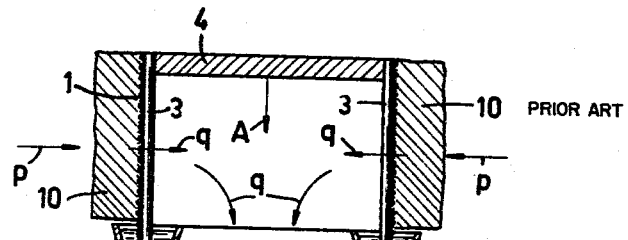
FIG. 1 — PRIOR ART
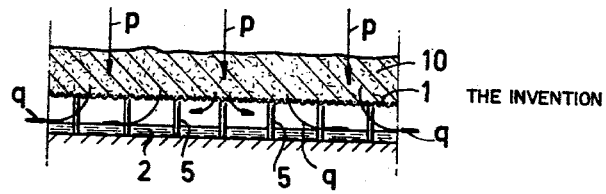
FIG. 2 — THE INVENTION
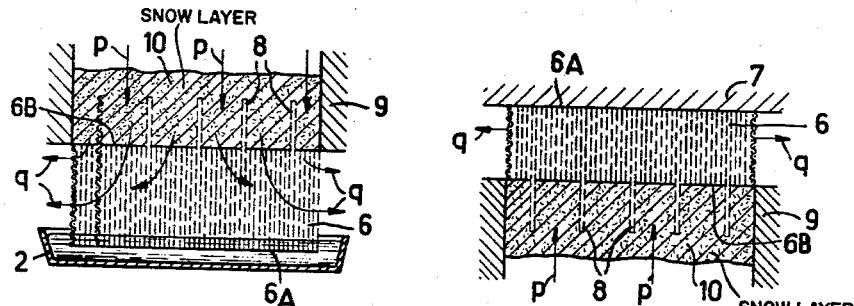
FIG. 3  FIG. 4
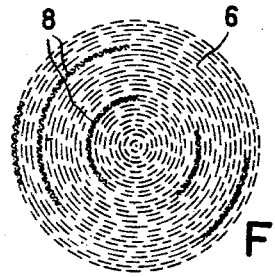
FIG. 5
INVENTOR
HENDRIK JOZEF VERBEEK
BY
AGENT

United States Patent Office 3,162,517
Patented Dec. 22, 1964

3,162,517
ARRANGEMENT FOR SEPARATING IN A SOLID STATE CONSTITUENTS FROM A GAS MIXTURE
Hendrik Jozef Verbeek, Eindhoven, Netherlands, assignor to North American Philips Company, Inc., New York, N.Y., a corporation of Delaware
Filed May 8, 1961, Ser. No. 108,347
Claims priority, application Netherlands, May 7, 1960, 251,343
3 Claims. (Cl. 55—269)

The invention relates to an arrangement for separating in a solid state constituents from a gas mixture by means of cooling.

It is often desirable, for example in air fractionating systems and in cold-gas refrigerators which are capable of condensing gas on their separating heads assuming a very low temperature, to free the gas mixture supplied before its fractionation or condensation from constituents, such as water vapour and carbon dioxide, which upon cooling are separated out in the form of ice or snow at much higher temperatures than those at which the fractionation or condensation takes place. These constituents may be troublesome because they may obstruct ducts, such as those in heat exchangers, or may contaminate the condensate, which, for example, in the case of liquefied air becomes manifest in an undesired muddiness.

For this purpose, various arrangements have been developed.

For example, an arrangement is known for separating out in a solid state constituents from a gas mixture by means of cooling, in which a support allowing gas to pass, such as a gauze partition, is arranged in the flow of the gas mixture, which support is connected with a cooling device so that the constituents are deposited on the support in the form of snow.

With such an arrangement it surprisingly appears to be possible to build up a constantly growing layer of snow on the gauze in a direction opposite the direction of flow of gas to be purified, which layer remains so porous that even at a fairly considerable thickness, the resistance to gas flow through the layer of snow remains below a reasonable value. The constituents to be separated out are then not only deposited on the layer of snow, but also in the layer, however, without obstructing it immediately.

The said possibility proves to exist only, however, when the partition allowing gas to pass which hereinafter is briefly termed gauze, is satisfactorily cooled. A continuous transport of cold must therefore take place between a source of cold different from the gas itself and the gauze, so that also in the layer of snow throughout its thickness a temperature gradient is constantly maintained.

It is known to solder the gauze to good conducting blocks or rods connected with a cold source or, for example, to pipes cooled by liquid gas, and to immerse an edge of the gauze into a layer of liquid having a low boiling point, such as liquid gas.

It proves to be fairly difficult to cool a large gauze surface uniformly at all points.

The invention provides a simple construction to achieve this.

According to the invention, the support is constituted by a wound apertured strip allowing gas to pass, for example a gauze strip. One end surface of the roll is connected to a cold source and the supply of the gas is supplied thereto in the direction of the center line of the roll, whereas the purified gas is conducted away laterally through the wound strip.

At the end surface of the roll not connected with an external source of cold, a constantly-growing porous layer of snow is built up from the supplied gas in a direction opposite to the direction of flow of the gas.

In one embodiment according to the invention, one end surface of the roll extends into the boiling liquid, such as liquid gas.

Preferably, parts, such as gauze layers which are larger than the roll are arranged and wound between its gauze layers. These parts project from the end surface collecting the flow.

This construction has the advantage that at the beginning of the separation of snow, the supplied gas is satisfactorily pre-cooled before it strikes the end surface of the roll. This also becomes manifest in the structure of the layer of snow formed. At first, fairly large crystals of snow are then deposited on said end surface, which crystals allow a good passage of gas and initiate in an excellent manner the formation of snow.

The arrangement according to the invention has the great advantage that, in order to cool the gas as uniformly as possible, it is not necessary to connect the gauze to a source of cold, for example by means of soldering.

The invention will be explained more fully with reference to the drawing.

FIG. 1 illustrates diagrammatically a known construction.

FIG. 2 shows the principle of the invention.

FIGS. 3 and 4 are longitudinal sections of embodiments of an arrangement according to the invention.

FIG. 5 shows an end surface of the wound gauze.

In the known construction of FIG. 1, a cylindrical cage 1 of gauze is used, the lower edge of which is arranged in a bath 2 of liquid gas. The cage 1 is connected with rods or pipes 3 and a block 4 of a material having excellent heat-conductive properties, such as copper, for example by means of soldering. Heat is, for example, extracted from these rods or pipes and the block 4 by the fact that they are connected with a source of cold, such as the cold head of a refrigerator (see the arrow A). The pipes 3 may also be cooled by means of low boiling-point liquid contained therein, such as liquid gas. The gas to be purified is supplied in the direction of the arrows $p$ and is conducted away through the gauze in the direction to the arrows $q$. On the gauze a constantly growing porous layer of snow 10 is formed in a direction opposite the direction of flow of the gas. All this is known.

The invention is directed to the idea that, in order to promote a very uniform cooling of the gauze throughout the surface, it would be advantageous to place the gauze 1 having a large number of legs 5 uniformly distributed throughout the surface in a bath of low boiling point liquid 2 (see FIG. 2).

The supply direction of gas to be purified is again indicated by arrows $p$, and the draining direction by arrows $q$.

Such a construction, which is otherwise very efficacious, cannot be easily manufactured in practice.

The same favourable effect is obtained, however, by winding a strip of gauze or different material allowing gas to pass, such as a perforated plate or foil, to a roll 6 (see FIGS. 3, 4 and 5). Said gauze strip is provided with substantially plane continuous end surfaces at opposite ends thereof bearing the reference numerals 6A and 6B.

One end surface 6A of this roll is cooled throughout the area, in FIG. 3, for example, by means of a bath 2 of low boiling point liquid or in FIG. 4 by means of a cooled partition 7.

The other end surface 6B of the roll 6 therefore becomes uniformly cold throughout its area.

On this end surface, a layer of snow is deposited in the direction of arrows $p$ when gas is supplied.

The gas is conducted away laterally through the roll 6 in the direction of the arrows $q$.

As stated above, it proves to be very efficacious to insert into the roll parts, for example larger layers of gauze 8, which project from the end surface of the roll on which is formed the layer of snow of constituents separated out.

The flow in the collecting space within the partition 9 may have a very stable character.

FIG. 4 illustrates the inverse construction of FIG. 3. The latter has the advantage that upon thawing of the separator for removing the layer of snow formed, the force of gravity cooperates to loosen the layer of snow 10.

It should be apparent that the separation of the impurities such as $CO_2$ and water is accomplished before the gas enters the gauze. Therefore, the solidification of $CO_2$ on the gauze cannot occur. From the foregoing it will also be clear that the $CO_2$ and the water solidify only upon contacting the gauze on the formed snow layer. Thus, the $CO_2$ and the ice crystals grow on the layer so that they cannot fall between the gauze and there is no need for a boundary element.

What is claimed is:

1. A separator for a gas mixture in which constituents are separated out in a solid state by cooling, comprising a partition having means defining a gas passage through which the gas mixture passes, a gauze-like screen secured to said partition in the path of flow of the gas mixture and comprising a helically wound gauze-like strip having a first substantially plane continuous end surface in abutting relationship with said means defining said gas passage, said end surface of said screen completely covering said gas passage whereby the gas mixture flows through said passsage and axially into said screen through said end surface, projecting portions extending from said end surface of said screen into said gas passage in said partition, said screen having a second substantially plane continuous end surface, a cooling device in uniform heat exchanging relationship with said second end surface and blocking the passage of gas through said second end surface, said cooling device uniformly cooling said screen and causing the constituents in said gas mixture to be separated out and deposited on said first end surface of said screen in the form of snow, said gas mixture then passing axially into said screen and being deflected laterally through said screen by said cooling device.

2. A separator for a gas mixture as claimed in claim 1 wherein said cooling device is a liquid gas into which said second end surface of the wound screen is submerged.

3. A separator for a gas mixture as claimed in claim 1 wherein said projecting portions are gauze layers.

References Cited in the file of this patent

UNITED STATES PATENTS

| | | |
|---|---|---|
| 1,860,111 | Miller | May 24, 1932 |
| 1,873,418 | Jones | Aug. 23, 1932 |
| 1,950,180 | Jones | Mar. 6, 1934 |
| 2,060,482 | Ballman | Mar. 10, 1936 |
| 2,084,403 | Maiuri | June 22, 1937 |
| 2,218,407 | Meyerhoefer | Oct. 15, 1940 |
| 2,940,168 | Monroe | June 14, 1960 |
| 2,999,364 | Hillingman | Sept. 12, 1961 |